United States Patent
Kondo et al.

(10) Patent No.: US 7,696,295 B2
(45) Date of Patent: Apr. 13, 2010

(54) CONDENSATION PRODUCTS OF SILICIC ACID DERIVATIVES AND OPTICAL WAVEGUIDE DEVICES USING THE SAME

(75) Inventors: Naoyuki Kondo, Sakai (JP); Takao Hayashi, Moriguchi (JP); Michael Popall, Wuerzburg (DE); Lothar Froehlich, Markt Rodach (DE); Ruth Houbertz, Werneck-Schraudenbach (DE); Sebastien Cochet, Wuerzburg (DE)

(73) Assignees: Panasonic Electric Works Co., Ltd., Kadoma-shi (JP); Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 12/162,618

(22) PCT Filed: Feb. 3, 2006

(86) PCT No.: PCT/JP2006/302294
§ 371 (c)(1), (2), (4) Date: Oct. 3, 2008

(87) PCT Pub. No.: WO2007/088640
PCT Pub. Date: Aug. 9, 2007

(65) Prior Publication Data
US 2009/0252471 A1  Oct. 8, 2009

(51) Int. Cl.
*C08G 77/20* (2006.01)
*C08G 77/04* (2006.01)
*C08G 77/12* (2006.01)
*C08G 77/00* (2006.01)
*G02B 6/00* (2006.01)

(52) U.S. Cl. ............................. 528/32; 528/10; 528/31; 528/34; 385/141; 385/143; 385/145

(58) Field of Classification Search .................. 528/10, 528/31, 32, 34; 385/141, 143, 145
See application file for complete search history.

(56) References Cited

U.S. PATENT DOCUMENTS

| 5,109,093 | A  | * | 4/1992 | Rees et al. | 528/14 |
| 6,727,337 | B2 | * | 4/2004 | Friedrich | 528/24 |
| 6,984,483 | B1 | * | 1/2006 | Roscher et al. | 430/280.1 |

FOREIGN PATENT DOCUMENTS

| DE | 39 39 846 | 6/1990 |
| WO | 01 04186 | 1/2001 |

* cited by examiner

*Primary Examiner*—Charlie Peng
(74) *Attorney, Agent, or Firm*—Oblon, Spivak, McClelland, Maier & Neustadt, L.L.P.

(57) ABSTRACT

The present invention relates to condensation products of silicic acid derivatives usable especially in optical waveguides and particularly to a condensation product obtained by condensing a silane diol compound (A) of the general formula (1): $R^1{}_2Si(OR^2)_2$ (1) wherein $R^1$ represents a group having at least one aromatic group and having 6 to 20 carbon atoms, and $R^2$ represents hydrogen (H which may also be a heavy hydrogen D), with a modified silane compound (B) of the general formula (2): $R^3Si(OR^4)_3$ (2) wherein $R^3$ represents an organic group having at least one C=C double bond; and $R^4$ represents a group of $C_nH_{2n+1}$ (n=a number of 1 or 2), in the molar ratio 1.1 to 1.4:1 [(A):(B)], and to a process for producing the same condensation product, as well as to an optical waveguide device fabricated using the same condensation product.

11 Claims, 1 Drawing Sheet

CONDENSATION PRODUCTS OF SILICIC ACID DERIVATIVES AND OPTICAL WAVEGUIDE DEVICES USING THE SAME

TECHNICAL FIELD

The present invention relates to optical waveguides for use in optical communications and optical integrated circuits, and organic/inorganic hybrid materials usable for related components thereof, and optical waveguide devices using the same materials.

BACKGROUND ART

Characteristics that materials for optical waveguides are required to have are less light absorption and low polarization dependency in the near infrared region used in the optical communications, refractive index-adjustability, excellent patterning capacity for waveguides, less increment of optical loss attributed to moisture absorption, and high productivity. Quartz-based materials hitherto have been used as materials for optical waveguides. The quartz-based materials show less light absorption in the near infrared region, but have a problem in poor productivity, since the manufacturing of optical waveguides from these materials requires a lot of steps which undesirably include a sintering step at high temperatures.

To overcome this problem, a variety of polymer materials have been developed. For example, JP-A-5-1148 (Patent Registration No. 2851019) discloses fluorinated polyimide usable as an optical material for optical waveguides. Fluorinated polyimide-based materials, however, have a problem in polarization dependency since fluorinated polyimide has many phenyl groups in the molecule, and thus has polarization dependency attributed to the orientation of the phenyl groups, although having less CH groups in the molecule and thus showing less light absorption in the near infrared region. Moreover, the use of the fluorinated polyimide-based materials for optical waveguides undesirably needs a baking step at a high temperature, which leads to cracking due to a stress attributed to the difference in linear expansion coefficient between a substrate and a film thereon, and the reactive ion etching is needed for patterning, which increases the number of manufacturing steps, resulting in poor productivity. Further disadvantages of fluorinated polymers:

- bad adhesion properties (Substrate/Polymer) of fluorinated materials
- especially polyimides: high thermal expansion coefficient
- lower glass-temperature $T_g$ (polymers tend to crystallize, when the fluorine content exceeds a certain amount)

Japanese Patent Registration No. 3445485 discloses a thermooptic device comprising a specified silicone material. However, silicone-based materials also suffer from the following problem: A silicone-based material is cured by reacting the remaining hydroxyl groups or alkoxy groups, accompanied by the formation of water or alcohol. As a result, it becomes impossible to increase the thickness of the resulting film, which limits the kinds of devices obtained from such a material. Moreover, reactive ion etching is needed for patterning, which increases the number of manufacturing steps, resulting also in a poor productivity.

Further, organic/inorganic hybrid materials having organic reactive groups and siloxane backbones are reported as materials which show less light absorption in the near infrared region and less polarization dependency, and which can be patterned by photolithography and also form less by-products (cf. WO 01/04186 A1).

According to the materials disclosed in this publication, the hydroxyl groups of $Ar_2Si(OH)_2$ are reacted (alkoxylation) with the alkoxy groups of $RSi(OR')_3$ in the ratio 1:1, and the resultant resinous product is blended with a photopolymerization initiator to obtain a resin composition which can be patterned by photolithography. This material shows less polarization dependency, because, if phenyl groups are contained in the molecules of the material, such phenyl groups are not oriented on the straight chain. In addition, this material has more excellent properties compared to optical waveguide material, since by-products such as water, alcohol or the like are not formed when the organic reactive groups thereof are cured. However, this material still has problems in water- and moisture-absorption, because of residual alkoxy groups remaining after reaction of the hydroxyl groups of $Ar_2Si(OH)_2$ with the alkoxy groups of $RSi(OR')_3$ in a ratio 1:1.

As has been discussed above, there is no polymer material available that displays all the required properties in good balance in state of the present art.

DISCLOSURE OF INVENTION

Objects of the present invention are to provide materials which show less light absorption and less polarization dependency in the near infrared region for use in optical communications, and are adjustable in refractive index and excellent in patterning capacity for production of waveguides, and which can be manufactured at high productivity and can provide cured products excellent in reliability, and to provide optical waveguides using the same materials.

The present invention relates to a condensation product which is obtained by condensation of a silane diol compound (A) of the general formula (1):

wherein $R^1$ represents a group having at least one aromatic group and having 6 to 20 carbon atoms; and $R^2$ represents a hydrogen (H) (H may also be a heavy hydrogen D), with a modified silane compound (B) of the general formula (2):

wherein $R^3$ represents an organic group having at least one double bond of C=C; and $R^4$ represents a group of $C_nH_{2n+1}$ (n=1 or 2), in the molar ratio 1.1 to 1.4:1 [(A):(B)].

In addition, the present invention relates to a process for producing a condensation product, which comprise condensing in such a manner as described above.

An optical waveguide device fabricated using this condensation product shows less light absorption and a less increment of optical loss attributed to moisture absorption in the wavelength band used in the optical communications and has high heat resistance.

The present invention also relates to a condensation product which is obtained by condensing a silane diol compound (A) of the general formula (1):

wherein $R^1$ represents a group having at least one aromatic group and having 6 to 20 carbon atoms; and $R^2$ represents a hydrogen (H) (H may also be a heavy hydrogen D), with a modified silane compound (B) of the general formula (2):

wherein $R^3$ represents an organic group having at least one double bond of C=C; and $R^4$ represents a group of $C_nH_{2n+1}$ (n=1 or 2), and a modified silane compound (C) of the general formula (3):

$$R^5Si(OR^4)_3 \quad (3)$$

wherein $R^4$ is as defined in the general formula (2); and $R^5$ represents a group of $CF_3(CF_2)_n(CH_2)_2$— (n=a number of 0 to 9) or a group of $C_6X_5$— (X=H or F), in the molar ratio 1.1 to 1.4:1 [(A):((B)+(C))].

In addition, the present invention relates to a process for producing a condensation product, which comprise condensing in such a manner as described above.

An optical waveguide device fabricated using this condensation product shows far less light absorption and has higher resistance to thermal shock and excellent sectility because of usage of compound (C).

BEST MODES FOR CARRYING OUT THE INVENTION

Figure 1:
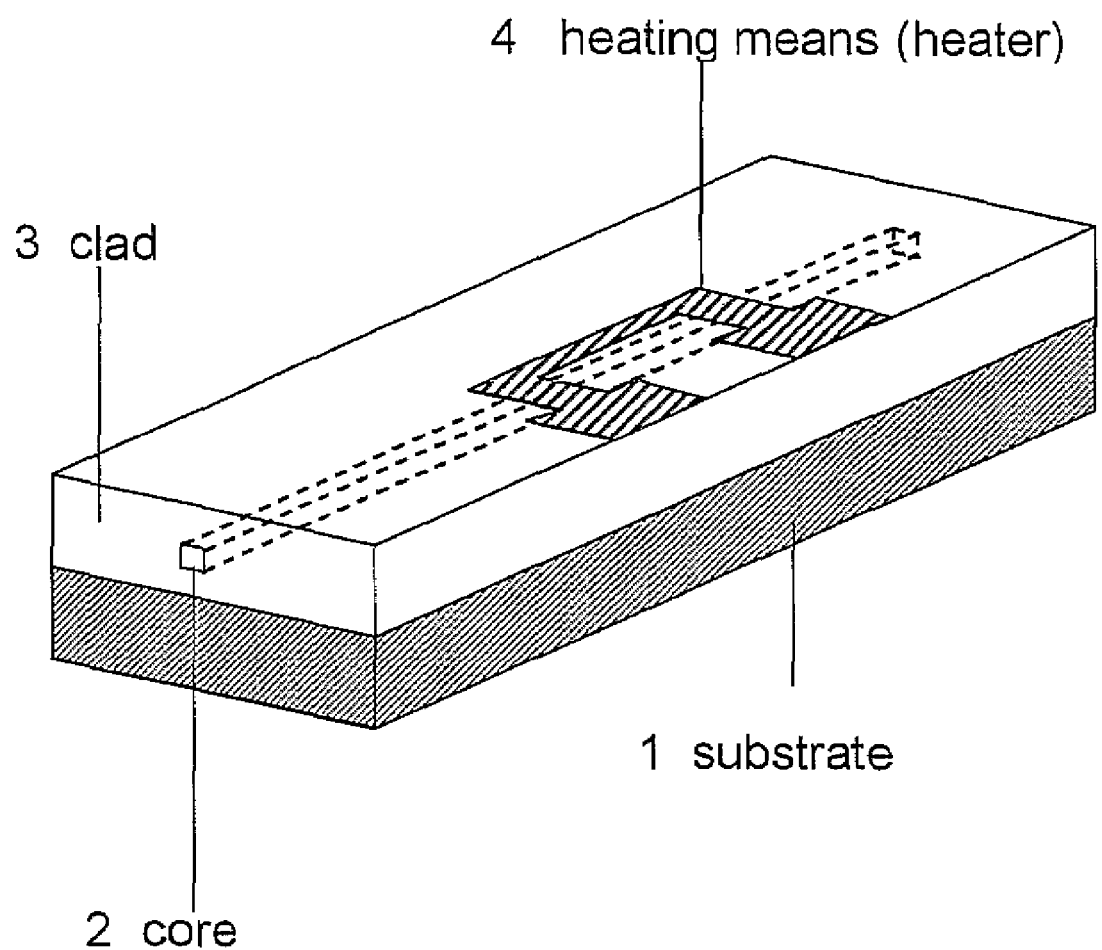
FIG. 1 is a perspective view of an optical waveguide device according to an embodiment of the present invention, wherein numeral 1 refers to a substrate; 2, to a core; 3, to a clad; and 4, to a heating means (a heater).

The condensation product of the present invention obtained by condensing the silane diol compound (A) with the modified silane compound (B) in the molar ratio 1.1 to 1.4:1 [(A):(B)] has polymerizable organic groups and therefore can be cured by light irradiation or heating in the presence of a suitable polymerization initiator. This condensation product absorbs less light in the near infrared region, and has less residual hydroxyl groups or alkoxy groups therein. As a result, the increment of light absorption in the near infrared region, induced by an increased amount of OH groups of water due to moisture absorption, can be decreased.

In the general formula (1), $R^1$ represents a group having at least one aromatic group and having 6 to 20 carbon atoms, and therefore, the use of the aromatic groups is effective to decrease the amount of the aliphatic CH groups in a whole of the system.

In a preferred embodiment of the condensation product according to the present invention, $R^1$ is a steric hindered substituted or unsubstituted aromatic group, and particularly preferred is $R^1$ containing a phenyl-, tolyl-, styryl- or naphtyl- group.

The group of $OR^2$ is normally a hydroxyl group; and $R^2$ is a hydrogen (H) or may also be a heavy hydrogen D. When a heavy hydrogen D is used, the resulting OD group does not absorb light in the near infrared region for use in the optical communications. This means that a non-reaction product of the silane diol compound (A) as a starting material, even if contained in the condensation product, does not give influence on the light absorption in the near infrared region, since it is the OD group that remains in the condensation product. In the present invention, the meaning of the terms such as the silane diol compound and the hydroxyl group includes a silane diol compound and a hydroxyl group which contain a heavy hydrogen D instead of a hydrogen (H).

In the general formula (2), $R^3$ is a reactive organic group having at least one C=C double bond. Accordingly, it is possible to form a crosslinked structure by adding a polymer- ization initiator to the condensation product obtained by condensing the hydroxyl groups of the silane diol compound (A) with the alkoxy groups of the modified silane compound (B) and reacting the reactive organic group to form the crosslinked structure.

$R^4$ represents a group of $C_nH_{2n+1}$ (n=1 or 2). When $R^4$ is a methyl or ethyl group, the amount of the CH groups in the residual $R^4$ which does not react with the silane diol compound (A) is small. Therefore, the resulting condensation product shows less light absorption in the near infrared region.

In one preferred embodiment of the condensation product according to the present invention, examples of the modified silane compound (B) of the general formula (2) include methacryloxypropyltrimethoxysilane, methacryloxypropyltri- ethoxysilane, styryltrimethoxysilane, styryltriethoxysilane, styrylethyltrimethoxysilane, styrylethyltriethoxysilane, tri- methoxyvinylsilane, triethoxyvinylsilane, and the like.

In the condensation product of the present invention, when the molar ratio of the silane diol compound (A) to the modified silane compound (B) is smaller than 1.1, the increment of optical loss due to the moisture absorption becomes larger. When this molar ratio is greater than 1.4, the resultant condensation product shows more light absorption in the near infrared region, since the amount of the residual hydroxyl groups which have not been reacted are larger. Moreover, the obtained resinous condensation product has a high viscosity, which results in poor workability. In view of not only the moisture absorption but also the handling ease of the materials (not having a high viscosity), the above molar ratio is desirably '1.2:1' to '1.3:1'.

In the present invention, the condensation product obtained by condensing the silane diol compound (A) with the modified silane compound (B) and the modified silane compound (C) in the molar ratio 1.1 to 1.4:1 [(A):((B)+(C))] has polymerizable organic groups, and therefore can be cured by irradiation with light or by heating, in the presence of a polymerization initiator.

In this condensation product, the crosslinking of the polymerizable organic groups becomes smaller in degree, because of the use of the modified silane compound (C) having no polymerizable group, as compared with the former condensation product obtained without the modified silane compound (C). Accordingly, this condensation product can have an improved flexibility after cured and thus becomes higher in resistance to thermal shock and also has excellent sectility: i.e., the cracking or chipping of the cut sections of a cured product thereof is reduced in amount, when such a cured product is cut by dicing or the like.

Moreover, this condensation product obtained using the modified silane compound (C) which has no polymerizable group absorbs far less light in the near infrared region, as compared with the former condensation product obtained without the modified silane compound (C). Furthermore, the amounts of the residual hydroxyl groups or alkoxy groups in the condensation product can be decreased, so that the increment of light absorption in the near infrared region, induced by the increased amount of OH groups of water due to the moisture absorption, can be decreased.

In the general formula (1), $R^1$ represents a group having at least one aromatic group and having 6 to 20 carbon atoms, and thus, the amount of CH groups in a whole of the system can be decreased because of such aromatic groups of the silane diol compound.

In one preferred embodiment of the condensation product according to the present invention, $R^1$ is a steric hindered substituted or unsubstituted aromatic group, and particularly preferred is $R^1$ containing a phenyl-, tolyl-, styryl- or naphthyl-group.

$OR^2$ is normally a hydroxyl group, and $R^2$ is a hydrogen (H) or may also be a heavy hydrogen (D). When a heavy hydrogen D is used, the OD group does not absorb light within the near infrared region for use in the optical communications. This means that, even if a non-reaction product of the silane diol compound (A) as a starting material is contained in the condensation product, such a non-reacted product does not give influence on the light absorption in the near infrared region, since it is the OD group that remains in the condensation product. In the present invention, the meaning of the terms such as the silane diol compound and the hydroxyl group includes a silane diol compound and a hydroxyl group which contain a heavy hydrogen D instead of a hydrogen (H).

In the general formula (2), $R^3$ is a reactive organic group having at least one C=C double bond. Accordingly, it is possible to form a crosslinked structure by adding a polymerization initiator to the condensation product obtained by condensing the hydroxyl groups of the silane diol compound (A) with the alkoxy groups of the modified silane compound (B) and reacting the reactive organic group of the compound (B) to form the crosslinked structure.

$R^4$ represents a group of $C_nH_{2n+1}$ (n=1 or 2). When $R^4$ is a methyl or ethyl group, the amount of the CH groups in the residual $R^4$ which does not react with the silane diol compound (A) is small. As a result, the light absorption in the near infrared region can be lowered.

In the general formula (3), $R^4$ is as defined in the general formula (2) (n in the general formula (2) and n in the general formula (3) may be the same or different); and $R^5$ represents a group of $CF_3(CF_2)_n(CH_2)_2$— (n is a number of 0 to 9, preferably 0 to 6) or a group of $C6X_5$— (X=H or F). The use of $R^5$ having less (aliphatic) CH groups makes it possible to lessen the light absorption in the near infrared region.

In one preferred embodiment of the condensation product according to the present invention, examples of the modified silane compound (C) of the general formula (3) include
$CF_3CH_2CH_2$—Si $(OCH_3)_3$,
$CF_3CH_2CH_2$—Si $(OCH_2CH_3)_3$,
$CF_3(CF_2)_3CH_2CH_2$—Si $(OCH_3)_3$,
$CF_3(CF_2)_3CH_2CH_2$—Si $(OCH_2CH_3)_3$,
$CF_3(CF_2)_5CH_2CH_2$—Si $(OCH_3)_3$,
$CF_3(CF_2)_5CH_2CH_2$—Si $(OCH_2CH_3)_3$,
$CF_3(CF_2)_7CH_2CH_2$—Si $(OCH_3)_3$,
$CF_3(CF_2)_7CH_2CH_2$—Si $(OCH_2CH_3)_3$,
$CF_3(CF_2)_9CH_2CH_2$—Si $(OCH_3)_3$,
$CF_3(CF_2)_9CH_2CH_2$—Si $(OCH_2CH_3)_3$,
$C_6F_5$Si $(OCH_3)_3$,
$C_6F_5$Si $(OCH_2CH_3)_3$,
$C_6H_5$Si $(OCH_3)_3$,
$C_6H_5$Si $(OCH_2CH_3)_3$,
$C_6F_5CH_2CH_2$Si $(OCH_3)_3$, and
$C_6F_5CH_2CH_2$Si $(OCH_2CH_3)_3$.

In the condensation product of the present invention, when the molar ratio of the silane diol compound (A) to the total of the modified silane compound (B) and the modified silane compound (C) is smaller than 1.1, the increment of optical loss due to the moisture absorption becomes larger. When this molar ratio is greater than 1.4, the amount of the residual hydroxyl groups which have not been reacted becomes larger. As a result, the quantity of absorbed light in the near infrared region becomes larger, and the resultant condensation product has a high viscosity, which results in poor workability.

In addition, it is possible to control the amount of the reactive groups in the condensation product, by changing the blending ratio of the modified silane compound (B) having reactive groups to the modified silane compound (C) having no reactive group. The toughness of a cured product provided by the condensation product is improved by reducing the amount of the reactive groups, and thus, the resultant cured product can have higher resistance to thermal shock and excellent sectility.

According to the present invention, it is preferable to condense the silane diol compound (A) with the modified silane compound (B) and the modified silane compound (C) in the molar ratio 1.1 to 1.4:1 [((A):((B)+(C))], with the proviso that at least 15 mol % of the modified silane compound (B) based on the total of the compounds (A), (B) and (C) is condensed. By doing so, the resultant condensation product can ensure reliable patterning capacity. When the mol % of the modified silane compound (B) based on the total of the compounds (A), (B) and (C) is decreased, the amount of the reactive groups in the resultant condensation product is too small, which leads to failure in curing. Thus, the curing may be insufficient when patterning in the order of micron is carried out.

All the condensation products according to the present invention, obtained using the modified silane compounds (B) of the general formula (2) in which $R^3$ is a group of $CH_2$=CH—$C_6X_4$—$(CH_2)_n$— (X=H or F, and n=a number of 0 to 2), can be sufficiently cured by light irradiation or heating, in the presence of polymerization initiators, and preferably, the cured products provided by such condensation products have less (aliphatic) CH groups, since such condensation products contain aromatic groups. Thus, these condensation products attain low material optical loss, showing less light absorption in the near infrared region. It is also possible to further decrease the material optical loss by fluorinating a part or a whole of the groups X in the group of —$C_6X_4$—.

The condensation products according to the present invention obtained using the modified silane compounds (C) of the general formula (3) in which $R^5$ represents a group of $CF_3(CF_2)_n(CH_2)_2$— (n=a number of 5 to 7), or cured products provided by such condensation products can show less light absorption in the near infrared region and less water absorption, because of the higher fluorination ratios and less CH groups. Therefore, the increment of the optical loss of waveguides is decreased. Moreover, because of the long molecular chain of the modified silane compound (C) used, the resultant condensation product and a cured product provided by such a condensation product can have improved flexibility and are hard to crack or chip when being subjected to thermal shock or being diced. Thus, such a condensation product and such a cured product can have high resistance to thermal cycles.

In case of the condensation product according to the present invention obtained using the silane diol compound of the general formula (1) in which $R^1$ represents a group of $C_6X_5$— (X=H or F), these bulky groups cause steric hindrance to hinder the self-reaction between each of the silane diol compounds (A), so that it becomes possible to complete the condensation reaction at a predetermined ratio. Since this condensation product advantageously contains aromatic groups, a cured product provided by this condensation product has less CH groups to thereby attain lower material optical loss, as well as less light absorption in the near infrared region. It is possible to further decrease the material optical loss by fluorinating a part or a whole of the groups X of the $C_6X_5$— group.

The condensation reaction of the silane diol compound (A) with the modified silane compounds (B) and (C) may be carried out by any of the conventional methods, for example, the method described in WO 01/04186 A1. Preferably, the condensation reaction is carried out at a temperature of 20 to 100° C., more preferably 50 to 100° C., or at the boiling point of the component having the lowest boiling point, according to the sol-gel procedure. Particularly preferred is the condensation reaction which is carried out at the boiling point of methanol. After the condensation reaction, the volatile components are removed by a conventional method, for example, by heating and/or reducing the pressure.

Lewis base or Brønsted base may be used to start or accelerate the condensation reaction. Examples of such a base are N-methylimidazole or amines such as benzyldimethylamine, etc. In a preferred embodiment of the present invention, trimethylamine, fluorinated ammonium or alkaline earth metal hydroxide is used as the base. Preferably, barium oxide, barium hydroxide, calcium oxide, calcium hydroxide, triethylamine or the like can be used, among which barium hydroxide is preferably used as the alkaline earth metal hydroxide.

For example, when an insoluble base such as alkaline earth metal hydroxide or the like is used in a reactive medium, it is recommended to separate such a base from a mixture obtained after the completion of the condensation reaction, for example, by way of filtration (e.g., under pressure).

Otherwise, chelated or unchelated alkoxide of aluminum or zirconium may be used for the condensation reaction, instead of the above base.

While the condensation products of the present invention as they are may be directly used, these condensation products may be used as compositions by further admixing with additives suitable for intended end uses. Such additives are initiators, flow control agents and pigments. Preferably, a cured product is obtained by curing the condensation product of the present invention in the presence of an initiator by light irradiation or heating, according to the conventional method.

Examples of a photo-curing type initiator usable in the photo-curing include 1-hydroxy-cyclohexyl-phenyl-ketone, 2-hydroxy-2-methyl-1-phenyl-propane-1-one, 2-benzyl-2-dimethylamino-1-(4-morpholinophenyl)-butanone-1,2-methyl-1[4-(methylthio)phenyl]-2-morpholinopropane-1-one, bis(2,4,6-trimethylbenzoyl)-phenylphosphine oxide and the like.

Examples of a thermo-curing type initiator used in the thermo-curing include organic peroxides such as ketone peroxide, peroxyketal, hydroperoxide, dialkylperoxide, diacylperoxide, peroxydicarbonate, peroxyester, etc. Above all, tert.-butylperoxy 2-ethylhexanoate, 1,1-(tert.-hexylperoxy)-3,3,5-trimethylcyclohexane, tert.-butylperoxyisopropylmonocarbonate, tert.-butylperoxy 2-ethylhexylmonocarbonate and α,α'bis(tert.-butylperoxy)diisopropylbenzene are preferably used.

Also, the present invention relates to an optical waveguide device comprising a core and a clad both of which are formed of the foregoing cured product, respectively. In general, the core and the clad making up the optical waveguide device are designed as to have different refractive indexes, respectively. Control of the refractive index can be achieved by changing the compositions, substituents, molecular weights, etc. of the condensation products or their cured products for use in the core and the clad, differently from each other. Preferably employed for such a control is a method of changing blending ratios by preparing at least two different condensation products or cured products thereof.

The optical waveguide device obtained by this procedure can possess the characteristics such as low material optical loss, low moisture absorption, photopatterning capacity, sectility and resistance to thermal shock.

According to another preferred embodiment of the present invention, the above optical waveguide device is an optical waveguide device provided with a means for heating at least the clad. FIG. 1 shows an example of the optical waveguide device. The optical waveguide device obtained in the present invention is excellent in thermooptic characteristics, having a thermooptic (TO) coefficient of preferably at most $-1 \times 10^{-4}/°$ C., more preferably at most $-1.5 \times 10^{-4}/°$ C., which is the index of the temperature dependency of the refractive index. The optical waveguide device obtained in the present invention usually has a TO constant of at least $-5 \times 10^{-4}/°$ C.

This optical waveguide device of the present invention can show large attenuation characteristics at a lower consumption. Examples of the optical waveguide device may include a variable optical attenuator (VOA), optical switches, etc.

Hereinafter, the present invention will be explained more in detail by way of Examples thereof, which should not be construed as limiting the scope of the present invention in any way. It is, of course, possible to appropriately modify the Examples of the present invention within a range adaptable for the subject matters of the present invention as described later, and such modifications are also included in the technical scope of the present invention.

EXAMPLES

Examples 1 to 3, and Comparative Examples 1 and 2

(Starting Materials)
Starting material (A1): Diphenylsilane diol
Starting material (B1): Styryltrimethoxysilane
Catalyst: Barium hydroxide monohydrate (Synthesis of Materials)

The starting materials (A1) and (B1) were blended in the molar ratio 1.25:1 [(A1):(B1)], to which toluene as a solvent was added in an amount of 20 wt. % based on the total weight of the starting materials. The mixture was stirred at 25° C. for 30 minutes, and barium hydroxide monohydrate as a catalyst was added in an amount of 0.1 wt. % based on the total weight of the starting materials. The mixture was further stirred for 30 minutes. After that, the mixture was heated to 60° C. and was stirred under refluxing. After seven days, the mixture was analyzed by FT-IR and was found to have no OH group derived from the starting material (A1), left to remain therein. After that, the toluene added and alcohol formed during the reaction were removed under reduced pressure using an evaporator. The mixture was then allowed to pass through a filter with a mesh size of 0.45 μm to thereby obtain a synthesized material as a final composition (Example 2).

The same operation was repeated for other blended mixtures, and the completion of the reaction of the resultant mixtures were confirmed by the FT-IR.

The starting materials (A1) and (B1) were blended in the molar ratio 1:1 [(A1):(B1)] (Comparative Example 1), 1.1:1 [(A1):(B1)] (Example 1), 1.4:1 [(A1):(B1)] (Example 3), or 1.5:1 [(A1):(B1)] (Comparative Example 2), and the resultant mixture was reacted in the same manner as in the above operation. It was impossible to completely eliminate the OH groups from the mixture of Comparative Example 2.

(Measurement of Material Optical Loss)

The material optical losses of the above synthesized materials relative to the near infrared rays with wavelengths of 1,310 nm and 1,550 nm were determined so as to investigate the characteristics of communication wavelengths.

2-Benzyl-2-dimethylamino-1-(4-morpholinophenyl)-butanone-1 (IRGACURE 369 available from Ciba Specialty Chemicals K.K.) (1 wt. %) as a photopolymerization initiator was added to each of the above synthesized materials, and the mixture was stirred at 60° C. for 60 minutes while being heated, to obtain a homogenous solution. When the viscosity of the synthesized material is high, the synthesized material may be dissolved in acetone or the like, to which a photopolymerization initiator is added, and the mixture is stirred, and then, the solvent is removed.

This material was cast into a frame so that the resultant material layer could have an uniform thickness, and the material layer was photo-cured by irradiation with UV having an intensity of 7 mW/cm$^2$ for 10 minutes. After that, the material layer was removed from the frame and heated at 200° C. for 2 hours under a nitrogen atmosphere, so as to accelerate the curing. The material optical loss of the resultant cured product was measured with a spectrophotometer. The results are shown in Table 1.

The material optical losses of the cured products obtained from Examples and Comparative Examples were 0.12 to 0.17 dB/cm at 1,310 nm, and 0.3 to 0.34 dB/cm at 1,550 nm, respectively. These materials showed less light absorption in the near infrared region.

(Measurement of Refractive Index)

Propylene glycol monomethylether acetate (PGMEA) (20 to 30 wt. %) was added to and dissolved in each of the above materials (80 to 70 wt. %) admixed with the above photopolymerization initiator, and the resultant solution was allowed to pass through a filter with a mesh size of 0.2 μm. This material was applied on a silicone wafer, using a spin coater, and was then heated at 100° C. for 3 minutes to remove the solvent. After that, the material layer was exposed to UV having an intensity of 20 mW/cm$^2$ through an i-line filter for 5 minutes under a nitrogen atmosphere. Thus, the material layer was cured, and then was further heated at 200° C. for one hour under a nitrogen atmosphere, so as to further accelerate the curing.

The refractive index of the resultant film formed on the silicone wafer was measured at 1,319 nm and 1,547 nm, respectively, according to the prism coupling method (Model 2010 available from Metricon Co. Ltd.). The results are shown in Table 1.

Example 4 and Comparative Example 3

(Starting Materials)
Starting material (A1): Diphenylsilane diol
Starting material (B1): Styryltrimethoxysilane
Starting material (C1): Trifluoropropyltrimethoxysilane
Catalyst: Barium hydroxide monohydrate (Synthesis of Materials)

The starting materials (A1), (B1) and (C1) were blended in the molar ratio 1.25:0.5:0.5 [(A1):(B1):(C1)] (Example 4), or 1:0.5:0.5 [(A1):(B1):(C1)] (Comparative Example 3), to synthesize a material in the same manner as in the above operation. The material optical losses and refractive indexes of the synthesized materials were evaluated in the same manner as above. The results are shown in Table 1.

(Fabrication of a Waveguide)

For example, a method of fabricating a slab linear waveguide using the synthesized materials obtained in Examples 1 and 4 is described.

(1) Preparation of a Core Material

PGMEA (20 wt. %) was added to and dissolved in the synthesized material (80 wt. %) obtained in Example 1, and IRGACURE 369 as a photopolymerization initiator (available from Ciba Speciality Chemicals K.K.) (1 wt. % based on the weight of the synthesized material) was added to the resultant solution. After stirring, the solution was allowed to pass through a filter with a mesh size of 0.2 μm to obtain a core material.

(2) Preparation of a Clad Material

The synthesized materials obtained in Examples 1 and 4 were blended in a ratio of 73.5:26.5 (wt. %) [Example 1:Example 4]. PGMEA (20 wt. %) was added to and dissolved in the resultant blended material (80 wt. %), and IRGACURE 369 as a photopolymerization initiator (1 wt. % based on the weight of the synthesized materials) was added to the resultant solution. After stirring, the solution was allowed to pass through a filter with a mesh size of 0.2 μm to obtain a clad material which had a refractive index 0.005 lower than that of the core material prepared using the synthesized material of Example 1.

(3) Formation of an Underclad Layer

The clad material was applied on a silicone wafer, and then was rotated at 1,000 rpm with a spin coater and heated at 100° C. for 3 minutes. After that, the resultant layer on the wafer was cured by irradiation with UV having an intensity of 20 mW/cm$^2$ for 5 minutes under a nitrogen atmosphere. After that, the cured layer was post-baked at 200° C. for one hour under a nitrogen atmosphere, to obtain an underclad layer.

In order to improve the adherence to the core material the underclad layer may be surface-treated with plasma.

(4) Formation of a Core Layer

The core material was applied on the underclad layer, and was then rotated at 2,000 rpm with a spin coater and heated at 100° C. for 3 minutes. After that, the resultant layer was cured by irradiation with UV having an intensity of 20 mW/cm$^2$ for 10 seconds through a mask under a nitrogen atmosphere. The cured layer was developed with methyl isobutyl ketone (MIBK), and then was heated at 100° C. for 3 minutes, and was further cured by irradiation with UV having an intensity of 20 mW/cm$^2$ for 5 minutes under a nitrogen atmosphere, to obtain a core layer with a size of 7 μm×7 μm.

(5) Formation of an Overclad Layer

The same clad material as that used in the underclad layer was applied on the core layer, and then was rotated at 900 rpm with a spin coater and heated at 100° C. for 3 minutes. After that, the resultant layer was cured by irradiation with UV having an intensity of 20 mW/cm$^2$ for 5 minutes under a nitrogen atmosphere. Thus, an overclad layer was obtained. After that, the overclad layer was heated at 200° C. for one hour under a nitrogen atmosphere.

Further, core materials were prepared using the synthesized materials obtained in Examples 2 and 3 and Comparative Example 1, respectively. Clad materials having refractive indexes 0.005 lower than those of the core materials, respectively, were prepared using the mixture of the synthesized materials of Examples 2 and 4, the mixture of the synthesized materials of Examples 3 and 4, and the mixture of the synthesized materials of Comparative Examples 1 and 3, respectively. Slab linear waveguides were fabricated in the same manner as above.

The waveguide optical losses of the respective linear waveguides determined by the cutback method (a method comprising the steps of measuring the optical losses of a plurality of linear waveguides with different lengths, and calculating an optical loss per unit length from the gradient) are shown in Table 2. It is known from Table 2 that the synthesized materials are sufficiently suitable for waveguides.

(Evaluation of Reliability)

Each of the linear waveguides as fabricated above was left to stand for 500 hours, 1,000 hours and 2,000 hours under an atmosphere of a temperature of 85° C. and a humidity of 85%, respectively. After that, the waveguide optical loss of the linear waveguide was measured, and the waveguide optical loss at a wavelength of 1,550 nm was compared with the initial waveguide optical loss (found before standing under the above atmosphere), and the increment between each of the above waveguide optical losses was defined as "the increment of the optical loss due to the moisture absorption" (see Table 2). In this regard, no increase of the optical loss was observed at a wavelength of 1,310 nm.

From the results of Tables 1 and 2, it is known that the synthesized materials and the waveguides obtained in Examples of the present invention show less significant differences in material optical loss and waveguide optical loss, in comparison to the synthesized materials and the waveguides obtained in Comparative Examples, and that the synthesized materials and the waveguides obtained in Examples of the present invention are greatly decreased in the increment of the optical loss due to the moisture absorption.

Due to these facts, it is understood that, by adjusting the blending ratio (molar ratio) of the starting material (A1) to the starting material (B1) at '1.1:1' to '1.4:1' [(A1):(B1)], it becomes possible to decrease the optical loss at wavelengths of 1,310 nm and 1,550 nm used in the optical communications, with lowering the moisture absorption.

Starting material (C2): Tridecafluorooctyltrimethoxysilane
Starting material (C4): Pentafluorophenyltriethoxysilane
Catalyst: Barium hydroxide monohydrate (Synthesis of Materials)

The starting materials (A1), (B2) and (C2) were blended in the molar ratio 1.25:0.8:0.2 [(A1):(B2):(C2)], to which toluene as a solvent was added in an amount of 20 wt. % based on the total weight of the starting materials. The mixture was stirred at 25° C. for 30 minutes, and barium hydroxide monohydrate as a catalyst was added in an amount of 0.1 wt. % based on the total weight of the starting materials. The mixture was further stirred for 30 minutes. After that, the mixture was heated to 60° C. and was stirred under refluxing. After seven days, the mixture was analyzed by FT-IR, whereas no remaining OH groups derived from the starting material (A1) could be observed. After that, added toluene and alcohol formed during the reaction were removed under reduced pressure using an evaporator. The mixture was then allowed to pass through a filter with a mesh size of 0.45 μm to thereby obtain a synthesized material as a final composition (Example 6).

The same operation was repeated for each of other blended mixtures, and the completion of the reaction of the resultant mixtures was confirmed by the FT-IR.

The starting materials (A1), (B2) and (C2) were blended in the molar ratio 1:0.8:0.2 [(A1):(B2):(C2)] (Comparative Example 5), 1.1:0.8:0.2 [(A1):(B2):(C2)] (Example 5), 1.4:0.8:0.2 [(A1):(B2):(C2)] (Example 7), or 1.5:0.8:0.2 [(A1):(B2):(C2)] (Comparative Example 4), and the resultant mixture was reacted in the same manner as in the above operation.

TABLE 1

| | Blending ratio | | | Material optical loss dB/cm | | Refractive index | |
|---|---|---|---|---|---|---|---|
| | Material (A1) | Material (B1) | Material (C1) | Non-reacted OH | 1,310 nm | 1,550 nm | 1,319 nm | 1,547 nm |
| Ex. 1 | 1.1 | 1 | | None | 0.13 | 0.32 | 1.572 | 1.568 |
| Ex. 2 | 1.25 | 1 | | None | 0.12 | 0.34 | 1.580 | 1.576 |
| Ex. 3 | 1.4 | 1 | | None | 0.17 | 0.33 | 1.587 | 1.584 |
| Ex. 4 | 1.02 | 0.5 | 0.5 | None | 0.13 | 0.30 | 1.551 | 1.549 |
| C. Ex. 1 | 1 | 1 | | None | 0.17 | 0.33 | 1.567 | 1.563 |
| C. Ex. 2 | 1.5 | 1 | | Some | — | — | | |
| C. Ex. 3 | 1 | 0.5 | 0.5 | None | 0.16 | 0.32 | 1.538 | 1.536 |

TABLE 2

| Core material | Waveguide optical loss, dB/cm | | Increment of optical loss due to moisture absorption, dB/cm (1,550 nm) | | |
|---|---|---|---|---|---|
| | 1,310 nm | 1,550 nm | 500 hrs | 1,000 hrs | 2,000 hrs |
| Ex. 1 | 0.20 | 0.48 | 0.15 | 0.24 | 0.32 |
| Ex. 2 | 0.18 | 0.51 | 0.14 | 0.21 | 0.25 |
| Ex. 3 | 0.26 | 0.54 | 0.10 | 0.15 | 0.18 |
| C. Ex. 1 | 0.26 | 0.50 | 0.20 | 0.30 | 0.55 |

Examples 5 to 8 and Comparative Examples 4 to 6

(Starting Materials)
Starting material (A1): Diphenylsilane diol
Starting material (B2): Styrylethyltrimethoxysilane It was impossible to completely eliminate the OH groups from the blended mixture of Comparative Example 4.

Further, the starting materials (A1), (B2) and (C2) were blended in the molar ratio 1.25:0.5:0.5 [(A1):(B2):(C2)], and the mixture was reacted in the same manner as above (Example 8). The synthesized material obtained from this blended mixture was found to have no OH group left to remain therein.

The results of the material optical losses and the refractive indexes measured by the foregoing methods are shown in Table 3.

Further, the starting materials (A1), (B2) and (C4) were blended in the molar ratio 1.25:0.5:0.5 [(A1):(B2):(C4)], and the mixture was reacted in the same manner as above (Example 9). The synthesized material obtained from this blended mixture was found to have no OH group left to remain therein. The material optical loss of this material was 0.12 dB/cm at a wavelength of 1,310 nm, and 0.26 dB/cm at a wavelength of 1,550 nm, and the amount of absorbed light in the near infrared region was low.

(Fabrication of a Waveguide)

(1) Preparation of a Core Material

PGMEA (20 wt. %) was added to and dissolved in the synthesized material (80 wt. %) obtained in Example 5, and IRGACURE 369 as a photopolymerization initiator (1 wt. % based on the weight of the synthesized material) was added to the resultant solution. After stirring, the solution was allowed to pass through a filter with a mesh size of 0.2 μm to obtain a core material.

(2) Preparation of a Clad Material

The synthesized materials obtained in Examples 5 and 8 were blended in the ratio 86.2:13.8 (wt. %) [Example 5:Example 8]. PGMEA (20 wt. %) was added to and dissolved in the resultant blended material (80 wt. %), and IRGACURE 369 as a photopolymerization initiator (1 wt. % based on the total weight of the synthesized materials) was added to the resultant solution. After stirring, the solution was allowed to pass through a filter with a mesh size of 0.2 μm to obtain a clad material which had a refractive index 0.005 lower than that of the core material prepared using the synthesized material of Example 5.

A linear waveguide was fabricated in the same manner as described above, from the core material and the clad material thus obtained.

Core materials were prepared in the same manner from the synthesized materials obtained in Examples 6 and 7, respectively, and each of these core materials was blended with the synthesized material obtained in Example 8 to thereby prepare a clad material. Linear waveguides were fabricated in the same manner as above, using the core materials and the clad materials thus obtained.

The synthesized materials obtained in Examples 5 and 8 were blended in the ratio 12.1:87.9 (wt. %) [Example 5:Example 8]. PGMEA (20 wt. %) was added to and dissolved in the resultant blended material (80 wt. %), and IRGACURE 369 as a photopolymerization initiator (1 wt. % based on the total weight of the synthesized materials) was added to the resultant solution. After stirring, the solution was allowed to pass through a filter with a mesh size of 0.2 μm to obtain a core material (Example 8+Example 5) which had a refractive index 0.005 higher than that of the clad material prepared using the synthesized material of Example 8.

PGMEA (20 wt. %) was added to and dissolved in the synthesized material (80 wt. %) obtained in Example 8, and IRGACURE 369 as a photopolymerization initiator (1 wt. % based on the weight of the synthesized material) was added to the solution. After stirring, the resultant solution was allowed to pass through a filter with a mesh size of 0.2 μm to obtain a clad material.

A linear waveguide was fabricated in the same manner as described above, from the core material and the clad material thus obtained.

Each of the linear waveguides as fabricated above was left to stand for 500 hours, 1,000 hours and 2,000 hours under an atmosphere of a temperature of 85° C. and a humidity of 85%, respectively. After that, the waveguide optical loss of the linear waveguide measured was compared with the initial waveguide optical loss (found before standing under the above atmosphere), and "the increment of the optical loss due to the moisture absorption" was determined. The results are shown in Table 4.

A core material was prepared using the synthesized material obtained in Comparative Example 5, in the same manner, and the resultant core material was blended with the synthesized material obtained in Comparative Example 6 to thereby obtain a clad material having a refractive index 0.005 lower than that of the core material prepared using the synthesized material of Comparative Example 5.

A linear waveguide was fabricated in the same manner as above, using the core material and the clad material thus obtained.

A core material was prepared using the synthesized materials obtained in Comparative Examples 6 and 5, to prepare a core material (Comparative Example 6+Comparative Example 5) which had a refractive index 0.005 higher than that of the clad material prepared using the synthesized material of Comparative Example 6 in the same manner as described above.

A linear waveguide was fabricated in the same manner as above, using the core material and the clad material thus obtained.

Each of the linear waveguides as fabricated above was left to stand for 500 hours, 1,000 hours and 2,000 hours under an atmosphere of a temperature of 85° C. and a humidity of 85%, respectively. After that, the waveguide optical loss of the linear waveguide measured was compared with the initial waveguide optical loss (found before standing under the above atmosphere), and "the increment of the optical loss due to the moisture absorption" was determined. The results are shown in Table 4.

A waveguide fabricated using a condensation product which was obtained by condensing the silane diol compound (A) with the modified silane compounds (B) and (C) in the molar ratio 1.1 to 1.4:1[(A):((B)+(C))] preferably showed less optical loss and less increment of the optical loss due to moisture absorption, as shown in Table 4.

TABLE 3

|  | Blending ratio | | | | Material optical loss (dB/cm) | | Refractive index | |
| --- | --- | --- | --- | --- | --- | --- | --- | --- |
|  | Material (A1) | Material (C2) | Material (B2) | Non-reacted OH | 1,310 nm | 1,550 nm | 1,319 nm | 1,547 nm |
| Ex. 5 | 1.1 | 0.2 | 0.8 | None | 0.14 | 0.31 | 1.537 | 1.535 |
| Ex. 6 | 1.25 | 0.2 | 0.8 | None | 0.13 | 0.30 | 1.541 | 1.539 |
| Ex. 7 | 1.4 | 0.2 | 0.8 | None | 0.13 | 0.30 | 1.544 | 1.542 |
| Ex. 8 | 1.25 | 0.5 | 0.5 | None | 0.12 | 0.27 | 1.498 | 1.496 |
| C. Ex. 4 | 1.5 | 0.2 | 0.8 | Some | — | — | — | — |
| C. Ex. 5 | 1 | 0.2 | 0.8 | None | 0.14 | 0.32 | 1.534 | 1.533 |
| C. Ex. 6 | 1 | 0.5 | 0.5 | None | 0.12 | 0.28 | 1.491 | 1.490 |

TABLE 4

| Core material | Waveguide optical loss, dB/cm | | Increment of optical loss due to moisture absorption, dB/cm (1,550 nm) | | |
|---|---|---|---|---|---|
| | 1,310 nm | 1,550 nm | 500 hrs | 1,000 hrs | 2,000 hrs |
| Ex. 5 | 0.20 | 0.56 | 0.16 | 0.22 | 0.29 |
| Ex. 6 | 0.20 | 0.53 | 0.10 | 0.20 | 0.21 |
| Ex. 7 | 0.19 | 0.56 | 0.04 | 0.08 | 0.07 |
| Exs. 8 & 5 | 0.18 | 0.43 | 0.06 | 0.15 | 0.17 |
| C. Ex. 5 | 0.21 | 0.57 | 0.20 | 0.29 | 0.40 |
| C. Exs. 6 & 5 | 0.19 | 0.44 | 0.18 | 0.28 | 0.37 |

Examples 6A and 6B Relative to Example 6

(Starting Materials)
Starting material (A1): Diphenylsilane diol
Starting material (B2): Styrylethyltrimethoxysilane
Catalyst (A): Barium oxide
Catalyst (B): Tetrabutylammonium hydroxide (Synthesis of Materials)
The starting materials (A1) and (B2) were blended in the molar ratio of 1.25:1 [(A1):(B2)], to which toluene as a solvent was added in an amount of 20 wt. % based on the total weight of the starting materials. The mixture was stirred at 25° C. for 30 minutes, and barium oxide as the catalyst (A) was added in an amount of 0.2 wt. % based on the total weight of the starting materials. The mixture was further stirred for 30 minutes. After that, the mixture was heated to 60° C. and was stirred under refluxing. After seven days, the mixture was analyzed by FT-IR, whereas no remaining OH groups derived from the starting material (A1) could be observed. After that, added toluene and alcohol formed during the reaction were removed under reduced pressure using an evaporator. The mixture was then allowed to pass through a filter with a mesh size of 0.45 μm to thereby obtain a synthesized material as a final composition (Example 6A).

The starting materials (A1) and (B2) were blended in the molar ratio of 1.25:1 [(A1):(B2)], and toluene as a solvent was added in an amount of 20 wt. % based on the total weight of the starting materials. The mixture was stirred at 25° C. for 30 minutes, and a solution of 10% tetrabutylammonium hydroxide in methanol as the catalyst (B) was added in such an amount that the amount of tetrabutylammonium hydroxide is 0.2 wt. % based on the total weight of the starting materials. The mixture was further stirred for 30 minutes. After that, the mixture was heated to 60° C. and was stirred under refluxing. After seven days, the mixture was analyzed by FT-IR, whereas no remaining OH groups derived from the starting material (A1) could be observed. After that, added toluene and alcohol formed during the reaction were removed under reduced pressure using an evaporator. The mixture was then allowed to pass through a filter with a mesh size of 0.45 μm to thereby obtain a synthesized material as a final composition (Example 6B).

As described above, the syntheses of the materials are possible using catalysts other than barium hydroxide monohydrate.

Examples 10 and 11

(Starting Materials)
Starting material (A1): Diphenylsilane diol
Starting material (B1): Styryltrimethoxysilane
Starting material (C2): Tridecafluorooctyltrimethoxysilane
Catalyst: Barium hydroxide monohydrate (Synthesis of Materials)
The starting materials (A1), (B1) and (C2) were blended in the molar ratio 1.25:0.25:0.75 [(A1):(B1):(C2)] (Example 10) and 1.25:0.35:0.65 [(A1):(B1):(C2)] (Example 11), respectively, and synthesized materials were obtained in the same manner as above.

The material optical loss was measured by the same method as above. As a result, the material optical loss was 0.11 dB/cm at a wavelength of 1,310 nm, and 0.24 dB/cm at a wavelength of 1,550 nm in Example 10, and it was 0.11 dB/cm at a wavelength of 1,310 nm, and 0.26 dB/cm at a wavelength of 1,550 nm in Example 11.

(Fabrication of a Waveguide)

(1) Preparation of a Core Material
PGMEA (20 wt. %) was added to and dissolved in a blended material (80 wt. %) which was obtained by blending the synthesized material of Example 11 with the synthesized material of Example 8 in the ratio 88.4:11. 6 (wt. %) Example 11:Example 8), and IRGACURE 369 as a photopolymerization initiator (1 wt. % based on the total weight of the synthesized materials) was added to the resultant solution. After stirring, the solution was allowed to pass through a filter with a mesh size of 0.2 μm to obtain a core material (Example 11+Example 8) having a refractive index 0.005 higher than that of a clad material prepared using the synthesized material of Example 11.

(2) Preparation of a Clad Material
The synthesized material obtained in Example 11 was dissolved in an amount of 20 wt. % in PGMEA, and IRGACURE 369 as a photopolymerization initiator (1 wt. % based on the weight of the synthesized material) was added to the resultant solution. After stirring, the solution was allowed to pass through a filter with a mesh size of 0.2 μm to obtain a clad material.

(3) Formation of an Underclad Layer
The clad material was applied on a silicone wafer and was rotated at 1,000 rpm with a spin coater and heated at 100° C. for 3 minutes. After that, the resultant layer was cured by irradiation with UV having an intensity of 20 mW/cm² for 5 minutes under a nitrogen atmosphere, and was then post-baked at 200° C. for one hour under a nitrogen atmosphere, to form an underclad layer.

(4) Formation of a Core Layer
The core material was applied on the underclad layer and was rotated at 2,000 rpm with a spin coater and heated at 100° C. for 3 minutes. After that, the resultant layer was cured by irradiation with UV having an intensity of 20 mW/cm² for 20 seconds through a mask under a nitrogen atmosphere, and was then developed with methylisobutylketone (MIBK). Then, the developed layer was heated at 100° C. for 3 minutes, and was further cured by irradiation with UV having an intensity of 20 mW/cm² for 5 minutes under a nitrogen atmosphere, to form a core layer with a size of 7 μm×7 μm.

A linear waveguide was fabricated in the same manner as described above, from the core material and the clad material thus obtained.

The waveguide optical loss of the linear waveguide was measured. As a result, it was 0.17 dB/cm at 1,310 nm, and 0.39 dB/cm at 1,550 nm.

A linear waveguide was fabricated in the same manner as described above, using the synthesized material of Example 10. In this case, the core portion was a little deformed. It was found from this result that the synthesized material of Example 11 was more suitable in order to carry out patterning in the order of micron.

From the above results, it is known that it became possible to ensure an excellent patterning capacity for the core portion by condensing the modified silane compound (B) having an organic reactive group in an amount of at least 15 mol % based on the total amount of the compounds (A), (B) and (C) [(A)+(B)+(C)].

Examples 12 to 14

(Starting Materials)
Starting material (A1): Diphenylsilane diol
Starting material (B1): Styryltrimethoxysilane
Starting material (B2): Styrylethyltrimethoxysilane
Starting material (B3): Methacryloxypropyltrimethoxysilane
Starting material (B4): Trimethoxyvinylsilane
Catalyst: Barium hydroxide monohydrate (Synthesis of Materials)
Synthesized materials were obtained by the same method as described above, using a blended material of the starting materials (A1) and (B1) in the molar ratio 1.25:1 [(A1):(B1)] (Example 2), a blended material of the starting materials (A1) and (B2) in the molar ratio 1.25:1 [(A1):(B2)] (Example 13), a blended material of the starting materials (A1) and (B3) in the molar ratio 1.25:1 [(A1):(B3)] (Example 12), and a blended material of the starting materials (A1) and (B4) in the molar ratio 1.25:1 [(A1):(B4)] (Example 14), respectively. The material optical losses of the respective synthesized materials are shown in Table 5.

As is understood from the foregoing, the material optical losses of the synthesized materials could be decreased by using the starting materials of the general formula (2) in which $R^3$ represents a group of $CH_2=CH-C_6X_4-(CH_2)_n-$ (X=H or F, and n=a number of 0 to 2).

TABLE 5

| | Blending ratio | | | | Non-reacted | Material optical loss, dB/cm | |
|---|---|---|---|---|---|---|---|
| | (A1) | (B1) | (B2) | (B3) | (B4) | OH | 1,310 nm | 1,550 nm |
| Ex. 12 | 1.25 | | | 1 | | None | 0.23 | 0.58 |
| Ex. 13 | 1.25 | | 1 | | | None | 0.15 | 0.36 |
| Ex. 14 | 1.25 | | | | 1 | None | 0.31 | 0.41 |
| Ex. 2 | 1.25 | 1 | | | | None | 0.12 | 0.34 |

Examples 15 and 16

(Starting Materials)
Starting material (A1): Diphenylsilane diol
Starting material (B2): Styrylethyltrimethoxysilane
Starting material (C1): Trifluoropropyltrimethoxysilane (n=0)
Starting material (C2): Tridecafluorooctyltrimethoxysilane (n=5)
Starting material (C3): Heptadecafluorodecyltrimethoxysilane (n=7)
Catalyst: Barium hydroxide monohydrate (Synthesis of Materials)
Synthesized materials were obtained by the same method as described above, using a blended material of the starting materials (A1), (B2) and (C2) in the molar ratio 1.25:0.5:0.5 [(A1):(B2):(C2)] (Example 8), a blended material of the starting materials (A1), (B2) and (C1) in the molar ratio 1.25:0.5:0.5 [(A1):(B2):(C1)] (Example 15), and a blended material of the starting materials (A1), (B2) and (C3) in the molar ratio 1.25:0.5:0.5 [(A1):(B2):(C3)] (Example 16), respectively. The material optical losses of the respective synthesized materials are shown in Table 6.

(Fabrication of a Waveguide)
A clad material was prepared by the same method as described above, using the synthesized material of Example 8. A core material was prepared by the same method as described above, using a blended material of the synthesized material of Example 8 and the synthesized material of Example 6. A linear waveguide was fabricated by the same method as described above, using the core material and the clad materials thus obtained.

A clad material was prepared by the same method as described above, using the synthesized material of Example 16. A core material was prepared by the same method as described above, using a blended material of the synthesized material of Example 16 and the synthesized material of Example 6. A linear waveguide was fabricated by the same method as described above, using the core material and the clad material thus obtained.

A core material was prepared by the same method as described above, using the synthesized material of Example 15. A clad material was prepared by the same method as described above, using a blended material of the synthesized material of Example 15 and the synthesized material of Example 2. A linear waveguide was fabricated by the same method as described above, using the core material and the clad material thus obtained.

A waveguide optical loss was measured after each of the linear waveguides thus obtained had been left to stand in the same manner as above for 2,000 hours under an atmosphere of a temperature of 85° C. and a humidity of 85%. This waveguide optical loss was compared with the initial waveguide optical loss (found before standing under the above atmosphere), and then, "an increment of optical loss due to moisture absorption" was determined.

As a result, the increment of optical loss of the waveguide fabricated using the starting material (Example 15) of the general formula (3) in which $R^5$ represents a group of $CF_3(CF_2)_n(CH_2)_2-$ (n=0) was 0.25 dB/cm. In contrast, the increment of optical loss of the waveguide fabricated using the starting material (Example 8) of the above general formula in which n is 5 (n=5) was 0.17 dB/cm, and the increment of optical loss of the waveguide fabricated using the starting material (Example 16) of the above general formula in which n is 7 (n=7) was 0.18 dB/cm.

As is understood from the above results, the waveguides fabricated using the starting materials containing the groups of $CF_3(CF_2)_n(CH_2)_2$— in each of which n is a number of 5 to 7 (n=5 to 7) showed less light absorption in the near infrared region, since the ratio of $(CF_2)$ groups is larger. In addition, the materials thus obtained have longer molecular lengths and thus become more flexible. As a result, the resistance to thermal shock of such materials is improved, and the sectility thereof is improved: cracking or chipping tends to hardly occur in the sections of such materials when cutting or dicing the materials. Moreover, the fluorination ratios of such materials are high, and therefore, they are excellent in moisture resistance.

TABLE 6

| | Blending ratio | | | | | Non-reacted | Material optical loss, dB/cm | |
|---|---|---|---|---|---|---|---|---|
| | (A1) | (B2) | (C2) | (C1) | (C3) | (C4) | OH | 1,310 nm | 1,550 nm |
| Ex. 8 | 1.25 | 0.5 | 0.5 | — | — | — | None | 0.12 | 0.27 |
| Ex. 15 | 1.25 | 0.5 | — | 0.5 | — | — | None | 0.14 | 0.32 |
| Ex. 16 | 1.25 | 0.5 | — | — | 0.5 | — | None | 0.10 | 0.22 |

Example 17

Fabrication of a Waveguide

An optical waveguide device was fabricated by the following method, using the synthesized materials of Examples 5 and 8.

(1) Preparation of a Core Material

PGMEA (20 wt. %) was added to and dissolved in the synthesized material of Example 5 (80 wt. %), and IRGACURE 369 as a photopolymerization initiator (1 wt. % based on the weight of the synthesized material) was added to the resultant solution. After stirring, the solution was allowed to pass through a filter with a mesh size of 0.2 μm to obtain a core material.

(2) Preparation of a Clad Material

The synthesized materials obtained in Examples 5 and 8 were blended in the ratio 86.2:13.8 (wt. %) (Example 5:Example 8), and PGMEA (20 wt. %) was added to and dissolved in the above blended material (80 wt. %). IRGACURE 369 as a photopolymerization initiator (1 wt. % based on the total weight of the synthesized materials) was added to the resultant solution. After stirring, the solution was allowed to pass through a filter with a mesh size of 0.2 μm to obtain a clad material having a refractive index 0.005 lower than that of the core material prepared using the synthesized material of Example 5.

An underclad layer, a core layer and an overclad layer were formed on a silicone wafer in this order, using these materials. A gold film was further formed on the overclad layer by the sputtering process. A positive type photoresist was applied on this wafer, and the solvent was removed from the photoresist on a hot plate. UV was applied to the photoresist covered with a mask having a circuit pattern as shown in FIG. 1, formed thereon, through an i-line filter, so that the portions of the wafer other than the circuit pattern could be irradiated with the UV. The portions of the resist irradiated with the UV were developed, and then, the gold film was etched. After that, a whole of the wafer was irradiated with UV to thereby develop a whole of the resist. Thus, a circuit was formed on the waveguide. Then, the waveguide was cut into chips by dicing to provide a variable optical attenuator (VOA) as shown in FIG. 1. Power of 60 mW was supplied to the electrical circuit of this VOA to heat the circuit and to thereby heat the clad material. Thus, the refractive index of the clad material was changed so as to leak light to an external. As a result, an attenuation of −40 dB was attained.

Optical waveguide devices fabricated using other materials showed excellent attenuation characteristics as well.

As has been fully described above, the cured products provided by the condensation products according to the present invention are excellent in thermooptic characteristics, as well as transparency, moisture resistance, resistance to thermal shock, sectility and productivity, and thus can be suitably used in optical waveguide devices.

INDUSTRIAL APPLICABILITY

The condensation products of silicic acid derivatives of the present invention show less light absorption and less polarization dependency in the near infrared region used in the optical communications, and are adjustable in refractive index. Accordingly, the condensation products of silicic acid derivatives of the present invention may be excellent in patterning capacity for waveguides and in productivity, and are also highly reliable over a long period of time. These materials can be suitably used in high performance optical waveguide devices and their related components for use in the optical communications and optical integrated circuits.

The invention claimed is:

1. A condensation product obtained by condensing a silane diol compound (A) of the general formula (1):

$$R^1_2Si(OR^2)_2 \qquad (1)$$

wherein $R^1$ represents a group having at least one aromatic group and having 6 to 20 carbon atoms, and $R^2$ represents hydrogen H or heavy hydrogen D, with a modified silane compound (B) of the general formula (2):

$$R^3Si(OR^4)_3 \qquad (2)$$

wherein $R^3$ represents an organic group having at least one C═C double bond; and $R^4$ represents a $C_nH_{2n+1}$ group wherein n is 1 or 2, wherein the molar ratio of (A):(B) is 1.1 to 1.4:1.

2. The condensation product of claim 1, wherein $R^3$ in the general formula (2) represents a $CH_2$═CH—$C_6X_4$—$(CH_2)_n$— group in which X is H or F, and n is a number of 0 to 2.

3. The condensation product of claim 1, wherein $R^1$ in the general formula (1) represents a $C_6X_5$— group in which X is H or F.

4. A cured product obtained by curing the condensation product of claim 1, by irradiation with light or heating.

5. An optical waveguide device comprising a core and a clad, wherein the core and the clad are formed of the cured product of claim 4, respectively.

6. The optical waveguide device of claim 5, which is provided with at least a means for heating the clad.

7. A condensation product obtained by condensing a silane diol compound (A) of the general formula (1):

$$R^1{}_2Si(OR^2)_2 \quad (1)$$

wherein $R^1$ represents a group having at least one aromatic group and having 6 to 20 carbon atoms, and $R^2$ represents hydrogen H or heavy hydrogen D, with a modified silane compound (B) of the general formula (2):

$$R^3Si(OR^4)_3 \quad (2)$$

wherein $R^3$ represents an organic group having at least one C=C double bond; and $R^4$ represents a $C_nH_{2n+1}$ group wherein n is 1 or 2, and a modified silane compound (C) of the general formula (3):

$$R^5Si(OR^4)_3 \quad (3)$$

wherein $R^4$ is as defined in the general formula (2); and $R^5$ represents a $CF_3(CF_2)_n(CH_2)_2$— group in which n is a number of 0 to 9, or a $C_6X_5$— group in which X is H or F, wherein the molar ratio of (A):((B)+(C)) is 1.1 to 1.4:1.

8. The condensation product of claim 7, wherein the modified silane compound (B) is condensed in an amount of at least 15 mol % based on the total of the compounds (A), (B) and (C).

9. The condensation product of claim 7, wherein $R^5$ in the general formula (3) represents a $CF_3(CF_2)_n(CH_2)_2$— group in which n is a number of 5 to 7.

10. A process for producing a condensation product, which comprises condensing a silane diol compound (A) of the general formula (1):

$$R^1{}_2Si(OR^2)_2 \quad (1)$$

wherein $R^1$ represents a group having at least one aromatic group and having 6 to 20 carbon atoms, and $R^2$ represents hydrogen H or heavy hydrogen D, with a modified silane compound (B) of the general formula (2):

$$R^3Si(OR^4)_3 \quad (2)$$

wherein $R^3$ represents an organic group having at least one C=C double bond; and $R^4$ represents a $C_nH_{2n+1}$ group wherein n is 1 or 2, wherein the molar ratio of (A):(B) is 1.1 to 1.4:1.

11. A process for producing a condensation product, which comprises condensing a silane diol compound (A) of the general formula (1):

$$R^1{}_2Si(OR^2)_2 \quad (1)$$

wherein $R^1$ represents a group having at least one aromatic group and having 6 to 20 carbon atoms, and $R^2$ represents hydrogen H or heavy hydrogen D, with a modified silane compound (B) of the general formula (2):

$$R^3Si(OR^4)_3 \quad (2)$$

wherein $R^3$ represents an organic group having at least one C=C double bond; and $R^4$ represents a $C_nH_{2n+1}$ group wherein n is 1 or 2, and a modified silane compound (C) of the general formula (3):

$$R^5Si(OR^4)_3 \quad (3)$$

wherein $R^4$ is as defined in the general formula (2); and $R^5$ represents a $CF_3(CF_2)_n(CH_2)_2$— group in which n is a number of 0 to 9, or a $C_6X_5$— group in which X is H or F, wherein the molar ratio of (A):((B)+(C)) is 1.1 to 1.4:1.

* * * * *